United States Patent Office 2,951,849
Patented Sept. 6, 1960

2,951,849
HYDRAZINE DERIVATIVES

Hugo Gutmann, Birsfelden, Balthasar Hegedüs, Binningen, and Paul Zeller, Neuallschwil, Switzerland, assignors to Hoffmann-La Roche Inc., Nutley, N.J., a corporation of New Jersey No Drawing. Filed June 30, 1958, Ser. No. 745,319

Claims priority, application Switzerland Sept. 23, 1957

7 Claims. (Cl. 260—326.3)

This invention relates to hydrazine derivatives. More particularly the invention relates to hydrazine derivatives which are represented by the following structural formula (I) $R_2$—CO—NH—NH—$R_1$ wherein $R_1$ represents lower alkyl and phenyl lower alkyl and $R_2$—CO represents prolyl, hydroxyprolyl or pyroglutamyl, and to salts thereof.

$R_1$ in Formula I represents a straight chain or branched chain lower alkyl group such as methyl, ethyl, propyl, isopropyl, butyl, isobutyl, sec.-butyl, amyl, hexyl, heptyl and the like, or such groups with a phenyl radical attached. The prolyl, hydroxyprolyl and pyroglutamyl radicals represented by $R_2$—CO are the acid radicals of proline, hydroxyproline and pyroglutamic acid, respectively. Both steric forms of hydroxyprolyl radicals are within the scope of the invention.

The acid hydrazides of this invention react with inorganic or organic acids to form acid addition salts. Illustrative salts include those formed with mineral acid, e.g. hydrohalides such as hydrochloride, hydrobromide, hydroiodide, etc., phosphate, sulfate, nitrate, as well as oxalate, tartrate, ascorbate, citrate and the like. Preferred salts are the hydrohalides, especially the hydrochloride. The acid addition salts are prepared by reacting the hydrazine derivatives with the appropriate acid, preferably in an inert solvent with the calculated amount of the acid.

A method for producing the acid hydrazides of Formula I is also a feature of this invention. This method comprises condensing an acid of the formula (II) $R_3$—COOH wherein $R_3$—CO represents a prolyl, hydroxyprolyl or pyroglutamyl radical, which may be N-acylated, with a substituted hydrazine corresponding to the formula (III) $H_2N$—NH—$R_1$ and acid salts thereof, in the presence of an N,N'-disubstituted carbodiimide and splitting off the N-acyl group that may be present. $R_1$ in the above formula has the same significance as in Formula I. Preferred acyl groups are those radicals which may easily be removed. Such acyl groups are, for example, radicals of monocarboxylic acids which may be eliminated by treatment with alkaline solution such as the trifluoroacetyl radical. A further group of suitable radicals are those which may be eliminated by hydrogenolysis, for example, carbobenzoxy, or by treatment with hydrogen bromide in glacial acetic acid, for example, carbocyclohexyloxy and carboallyloxy.

The condensation may be effected at a temperature of about 0° to about 50° C., preferably at room temperature or slightly above. Water or an inert organic solvent such as methylene chloride, chloroform, dioxane, tetrahydrofuran, dimethylformamide, acetonitrile, etc., may be used. The amino acid, the substituted hydrazine or the salt thereof and the carbodiimide are used preferably in approximately equimolecular proportions.

Any carbodiimide may be used for the condensation reaction, since the groups attached to the carbodiimide radical do not interfere with the principal reaction. Illustrative groups which may be attached to the carbodiimide radical include lower alkyl groups such as methyl, ethyl, propyl and the like, cycloalkyl groups such as cyclohexyl and the like, and aromatic groups such as tolyl, benzyl and the like. N,N'-dicyclohexyl-carbodiimide is preferred. Such carbodiimides may be produced by treating a disubstituted urea with p-toluenesulfonyl chloride in pyridine. During the reaction of the amino acid with the hydrazine compound, the carbodiimide is converted to a urea derivative from which the reaction product is readily separated.

The optically active amino acids as well as the racemic acids may be used as starting materials. The optical configuration of the starting material remains unchanged during the process of synthesizing the novel hydrazides.

The compounds of this invention are monoamine oxidase inhibitors, that is, they inhibit the activity of monoamine oxidase which effects the deactivation of physiological regulators such as serotonin, tryptamine, epinephrine, etc., and stimulate the central nervous system. They are useful in psychotherapy for relief of disturbed or depressed states. They are also useful for increasing weight in cases where cachexia is present. The free hydrazine compound or a medicinally acceptable acid addition salt thereof may be administered orally or parenterally in conventional solid or liquid dosage forms such as tablets, capsules, injectables, etc., comprising therapeutic doses incorporated in a conventional solid or liquid vehicle with or without excipients.

The following examples are illustrative of the invention. All temperatures are stated in degrees centigrade.

Example 1

24.9 g. of N-carbobenzoxy-L-proline were dissolved in 150 cc. of acetonitrile and 14.1 cc. of triethylamine were added. 11.05 g. of isopropylhydrazine monohydrochloride were added thereto. The mixture was stirred for ½ hour and 20.6 g. of N,N'-dicyclohexyl-carbodiimide dissolved in 50 cc. of acetonitrile were added. The mixture was stirred for 3 more hours, the temperature being kept between 25 and 30°. The undissolved N,N'-dicyclohexyl-urea was filtered off under suction, the filtrate was concentrated in vacuo and the residue was extracted with ether. The ethereal extract was shaken, in 3 portions, with a total of 200 cc. of 1.5 N hydrochloric acid. The pH of the hydrochloric acid solution was adjusted to 7–8 by means of concentrated sodium hydroxide solution, whereupon an oil separated, which crystallized slowly. By recrystallization from ethyl acetate-pretroleum ether, there was obtained 1-(N-carbobenzoxy-L-prolyl)-2-isopropyl-hydrazine melting at 69–70°, $[\alpha]_D = -66°$ (c.=1 in N hydrochloric acid).

30.6 g. of 1-(N-carbobenzoxy-L-prolyl)-2-isopropyl hydrazine were dissolved in a mixture of 20 cc. of concentrated hydrochloric acid and 200 cc. of water and hydrogenated in the presence of palladium on charcoal. When the absorption of hydrogen had subsided, the catalyst was filtered off, the filtrate was diluted with water to 3000 cc. and filtered through a polystyrene quaternary amine anion exchange column (Amberlite IRA–400). The column was rinsed with water until the pH was about 7. The filtrate was concentrated to dryness in vacuo and the residue was recrystallized from petroleum ether. The 1-L-prolyl-2-isopropyl-hydrazine melted at 62–63°, $[\alpha]_D = -43°$ (c.=1 in water).

*Example 2*

26.5 g. of N-carbobenzoxy-L-hydroxyproline were dissolved in 200 cc. of acetonitrile and treated with 14.1 cc. of triethylamine. 11.05 g. of isopropylhydrazine hydrochloride were added and the mixture was stirred for 20 minutes. 20.6 g. of N,N'-dicyclohexyl-carbodiimide mixed with 50 cc. of acetonitrile were added and the mixture was stirred for 3 more hours, the temperature being kept between 25 and 30°. After cooling with ice, the precipitate was filtered off under suction and digested with 300 cc. of 3 N hydrochloric acid. The reaction product went into solution whereas the dicyclohexyl urea remained as a residue. The mixture was filtered and the filtrate was adjusted to pH 6–7 by means of sodium hydroxide solution. The precipitated reaction product was filtered off under suction and recrystallized from ethyl acetate. The 1-(N-carbobenzoxy-L-hydroxyprolyl)-2-isopropyl-hydrazine melted at 166°, $[\alpha]_D = -62°$ (c.= 1 in N hydrochloric acid).

The 1 - (N - carbobenzoxy - L - hydroxyprolyl) - 2-isopropyl-hydrazine was hydrogenolyzed according to the procedure in Example 1 to obtain 1-L-hydroxyprolyl-2-isopropyl-hydrazine, the monohydrochloride of which melted at 163–164°, upon recrystallization from isopropanol. $[\alpha]_D = -37°$ (c.=1 in water).

*Example 3*

12.9 g. of DL-pyroglutamic acid were dissolved in 150 cc. of acetonitrile and 14.1 cc. of triethylamine. 11.05 g. of isopropylhydrazine monohydrochloride were added thereto, the mixture was stirred for 1 hour and then a solution of 20.63 g. of N,N'-dicyclohexyl-carbodiimide in 50 cc. of acetonitrile was added dropwise. Stirring was continued for 4 hours, the temperature being kept between 25–30°. The N,N'-dicyclohexyl-urea that separated was filtered off under suction and the filtrate was concentrated in vacuo. The residue was extracted with tetrahydrofuran and the extract concentrated in vacuo. The residue was dissolved in 350 cc. of water and a small amount of undissolved material was filtered off under suction. The filtrate was diluted with water to 1000 cc. and filtered through a column consisting of 200 g. of Amberlite IRA–400. The filtrate was washed at first with 4000 cc. of water, then with 4000 cc. of 0.2 N ammonia. The filtrate was then concentrated in vacuo. The residue, 1-DL-pyroglutamyl-2-isopropyl-hydrazine, melted at 136–137° (after recrystallization from ethyl acetate).

In an analogous manner and starting from L-pyroglutamic acid, there was obtained 1-L-pyroglutamyl-2-isopropyl-hydrazine, M.P. 119–120°; $[\alpha]_D = -7.1°$ (c.=1 in water).

*Example 4*

24.9 g. of N-carbobenzoxy-L-proline were dissolved in 200 cc. of acetonitrile and 14.1 cc. of triethylamine. 15.85 g. of benzylhydrazine monohydrochloride were added thereto, the mixture was stirred for 30 minutes and then a solution of 20.6 g. of N,N'-dicyclohexyl-carbodiimide in 50 cc. of acetonitrile was added dropwise. Stirring was continued for 4 hours, the temperature being kept between 25–30°. The N,N'-dicyclohexyl-urea that separated was filtered off under suction and the filtrate was concentrated in vacuo. The residue was extracted with ether and the extract shaken, in 8 portions, with a total of 650 cc. of 1.5 N hydrochloric acid. The solution obtained was adjusted to pH 7–8 by means of sodium hydroxide solution, whereupon an oily material separated, which slowly crystallized. Recrystallization from benzene-petroleum ether gave the 1-(N-carbobenzoxy - L - prolyl) - 2 - benzyl - hydrazine melting at 93–96°.

10 g. of 1-(N-carbobenzoxy-L-prolyl)-2-benzyl-hydrazine were dissolved in 50 g. of a 18% solution of hydrogen bromide in glacial acetic acid and allowed to stand for 1½ hours. Thereupon, the solution was concentrated at 40° in vacuo, the residue dissolved in water and shaken with ether. The aqueous solution was filtered through a polystyrene quaternary amine anion exchange column (Amberlite IRA–400). The filtrate was concentrated to dryness and the crystalline residue was recrystallized from ether-petroleum ether. The 1-L-prolyl-2-benzyl-hydrazine was obtained as colorless prisms melting at 92–93°; $[\alpha]_D = -49°$ (c.=1 in water).

We claim:

1. A compound selected from the group consisting of those represented by the formula $$R_2—CO—NH—NH—R_1$$

wherein $R_1$ represents a member of the group consisting of lower alkyl and phenyl lower alkyl and $R_2$—CO represents a member of the group consisting of the radicals prolyl, hydroxyprolyl and pyroglutamyl, and medicinally acceptable acid addition salts thereof.

2. 1-prolyl-2-isopropyl-hydrazine.
3. 1-hydroxyprolyl-2-isopropyl-hydrazine.
4. 1-pyroglutamyl-2-isopropyl-hydrazine.
5. 1-prolyl-2-benzyl-hydrazine.
6. 1-hydroxyprolyl-2-benzyl-hydrazine.
7. 1-pyroglutamyl-2-benzyl-hydrazine.

References Cited in the file of this patent

UNITED STATES PATENTS

| | | |
|---|---|---|
| 2,750,388 | Yale | June 12, 1956 |
| 2,753,352 | Bernstein et al. | July 3, 1956 |
| 2,834,781 | Petrie et al. | May 13, 1958 |

OTHER REFERENCES

Sheehan et al.: J. Am. Chem. Soc., vol. 77, p. 1067 (1955).